United States Patent [19]

Kish

[11] Patent Number: 4,934,499

[45] Date of Patent: Jun. 19, 1990

[54] OVERRUNNING SPRING CLUTCH ASSEMBLY

[75] Inventor: Jules G. Kish, West Haven, Conn.

[73] Assignee: United Technologies Corporation, Hartford, Conn.

[21] Appl. No.: 288,412

[22] Filed: Dec. 21, 1988

[51] Int. Cl.⁵ ............................................ F16P 13/04
[52] U.S. Cl. .................................................... 192/415
[58] Field of Search ............ 192/415, 56 C, 74, 30 V; 29/173

[56] References Cited

U.S. PATENT DOCUMENTS

| | | | |
|---|---|---|---|
| 1,934,790 | 11/1933 | Brownlee | 192/41.5 |
| 1,940,880 | 12/1933 | Pitter | 192/41.5 |
| 1,952,415 | 3/1934 | Brownlee | 192/41.5 |
| 1,966,267 | 7/1934 | Starkey | 192/41.5 |
| 2,030,333 | 2/1936 | Starkey | 192/107 T |
| 2,073,408 | 3/1937 | Litchfield | 192/41.5 |
| 2,571,232 | 10/1951 | Gorske | 192/415 |
| 2,574,714 | 11/1951 | Smith | 192/41.5 |
| 2,595,454 | 5/1952 | Greenlee | 464/40 |
| 2,598,993 | 6/1952 | Gorske | 142/8 C |
| 2,700,442 | 1/1955 | Gorske | 192/47 |
| 3,298,486 | 1/1967 | Perryman | 192/47 |
| 4,570,318 | 2/1986 | Kish | 29/173 |
| 4,583,628 | 4/1986 | McCormick | 192/76 |
| 4,690,390 | 7/1987 | Kish | 192/41.5 |

Primary Examiner—Leslie A. Braun
Assistant Examiner—Nicholas Whitelaw
Attorney, Agent, or Firm—Darby & Darby

[57] ABSTRACT

A spring clutch assembly is disclosed having an input clutch member (3), an output clutch member (4), coaxial therewith, and further having a clutch spring (8) disposed partially in each clutch member, the spring placed on an arbor (12) having a shoulder (20) at the input end thereof. The arbor is fixed to the input member by a collet fit and extends through the output member into a housing (2) where it is rotatively supported by bearings (21). The input member is also supported rotatively by bearings (6) which may further include a squeeze film damper (27) to control the assembly spring rate and thereby minimize vibrations by traversing a rigid body mode vibration at low speed. Such spring clutch assemblies are particularly useful in high RPM environments where vibrations must be held to a minimum. A clutch spring is also disclosed, having a very fine axial cut across a cross-over coil (41) and transition coils (54) disposed between the teaser coils (52) and the central coils (53). The transition coils form a gradual ramp (58) to distribute stresses over several coils, preventing spring failure.

16 Claims, 5 Drawing Sheets

OVERRUNNING SPRING CLUTCH ASSEMBLY

The invention was made with Government support under a contract awarded by the Department of the Army. The Government has certain rights in this invention.

CROSS REFERENCE TO RELATED APPLICATIONS

This application is related to copending U.S. Patent application, titled "Coil Spring for a Spring Clutch Assembly", Attorney Docket No. 7738/04028, filed on even date herewith.

TECHNICAL FIELD

This invention relates to overrunning spring clutch assemblies which employ a helical band in the form of a coil spring as a friction element for transmitting torque from a drive member to a driven member.

BACKGROUND

Various spring clutches are known for transferring torque from a drive member to a driven member such as that disclosed in U.S. Pat. No. 4,570,318 to Kish. Spring clutch assemblies are preferred as torque transmitting devices where overrunning conditions would be encountered. Such conditions occur where the driven member attains a higher rotational speed than the drive member and therefore declutching is required to prevent rotation of the driver. Overrunning spring clutch assemblies generally utilize a coil spring which expands radially under a driven load to couple two clutch members, an input member and an output member. Each clutch member includes a bore where the coil spring is located, with approximately one half of the spring in the input member and one half in the output member. The clutch spring is usually fixed at the drive end through press fitting onto an arbor which is attached to the input member. The arbor is coaxial with the input and output members, passing through the hollow core of the spring. The arbor serves as a centering means for alignment and support of the coil spring.

In the non-rotating state, a space is provided between the spring and the inner bore surfaces of the clutch members, except at the ends, where "teaser" coils are in contact with the inner surfaces. These teaser coils ride on the surfaces to actuate the spring. When the input member begins to rotate, in a direction counter to the pitch of the spring coils, the teaser coils dragging against the output member cause the spring to unwind, expanding radially so that it is in driving contact with the bore surfaces along its entire length, transferring torque from the input to output member.

In the overrunning condition, the driven member rotates faster than the drive member, in the direction of the spring pitch, thereby driving the teaser coils to rewind the spring and disengage the driven member from the driver. This may occur, for example, in a helicopter after engine shutdown when momentum maintains main rotor rotation.

While spring clutches have been utilized in many applications, various problems ave limited their usefulness in helicopter aircraft. Attempts have been made to expand the speed range of spring clutches, typically used from 4000 to 8000 RPM, to high RPM applications of up to approximately 30,000 RPM, to increase their compatibility with gas turbine engines. However, severe vibrations have been encountered which may cause spring failure or other damage to the assembly.

The vibrations may occur partially due to the difficulty in balancing the input and output clutch members. Generally, the input and output members are placed in an inboard/outboard relation, with the output member having the input member internally located, providing a series type spring mounting. While both the input and output clutch members are dynamically and statically balanced prior to assembly, each will still have a slight residual imbalance. Once assembled, the input and output clutch members, coupled by the coil spring are dynamically balanced. However, each engagement and disengagement of the clutch spring with the driven member realigns the residual imbalances which could eventually result in the residual imbalances coinciding, providing an intolerable imbalance which generates severe vibration. Should the imbalance occur in the drive mode, with the spring in the expanded condition, the spring coil which traverses the gap between the input and output members may partially enter the gap, misaligning or cocking the spring and causing strain with the potential for spring fracture.

The most serious problem encountered in high rpm operation occurs when the input member travels through a rigid body mode of vibration. A rigid body mode is so called because the assembly components do not bend, but tend to vibrate as a spring/mass system about the supports. Balancing the components alone is insufficient to provide stable operation through a rigid body mode even if the point of maximum deflection is located at a bearing. Normally, rigid body modes can be traversed in operation by assuring that the parts are in good balance and by reliance on the damping inherent in a normal oil lubricated bearing. However, it was found that the maximum deflection in a spring clutch assembly did not occur at the bearing locations, and could not be traversed without exceeding established G force limits, as the mode occurred at high speed and even with lubrication there was insufficient damping.

To stiffen the assembly to reduce deflection, the assembly may utilize increased spread between the bearings. However, this is difficult to accommodate where space is limited, and is also undesirable from a weight standpoint.

Another problem with existing spring clutches is attaining proper spring positioning. Generally, the spring is placed on the arbor using precision measurements, with the arbor then inserted and attached to the input member, usually by pinning. If the coil spring is improperly placed on the arbor, the spring may bind with the input member, inducing undesirable preload, which may fracture the end teaser coils during operation. Similarly, the absence of end spacing for accommodating axial spring displacement on the arbor could cause the spring to bind with the output member during expansion, causing improper clutch operation.

Yet another problem with clutch springs is the tendency to fracture in the transition area between the central coils and the end teaser coils. Generally, the difference in outside diameter of the teaser coils and central coils may cause one or more coils in the transition area to be unsupported when expanded, overstressing those coils and possibly inducing coil failure.

Typically, clutch springs have a central cross-over coil which traverses the gap between the input and output members formed by a near-axial cut during machining. This provides half the axial crossover coil in the input member and half in the output member. However, to achieve an axial cut using a conventional manufacturing method, a small hole is usually left on one side of the finished spring. Under the influence of centrifugal force, the missing material induces an imbalance, producing vibrations which could damage the spring clutch assembly.

When torque is applied to an overrunning clutch spring which does not have an axial cut, the spring may be unsupported as it pushes against the gap between the input and output clutch members. The spring then attempts to unwind into a U-shape and in so doing, may cause the input and output ends of the spring to be displaced radially with respect to each other, essentially cocking the spring. This radial deflection must be minimized to reduce or eliminate the resultant centrifugal imbalance which would be amplified in a high RPM application.

SUMMARY OF THE INVENTION

It is an object of the present invention to provide an overrunning spring clutch assembly which alleviates the difficulties in spring installation.

It is a further object of the present invention to provide a spring clutch assembly which is less susceptible to vibrations induced by residual imbalances.

It is a further object of the present invention to provide a spring clutch assembly which is usable at high RPM conditions, of about 30,000 RPM, with a reduced potential for spring failure.

It is another object of the present invention to provide a coil spring for a spring clutch assembly which eliminates the weakness between the end teaser coils and the center coils.

It is another object of the present invention to provide a coil spring which is less susceptible to imbalances induced by the cross-over coil cut.

According to the present invention, a spring clutch assembly for coupling a drive member to a driven member is disclosed which includes a housing, with an input clutch member and an output clutch member, each clutch member separably rotatably disposed in the housing. The assembly also includes an arbor extending interiorly through a bore in both members, the arbor engaged and rotatable with the input member. The assembly further includes a coil spring disposed over the arbor, about half the spring being in the input member and half being in the output member, the coil spring being expandable into contact with the input and output members for transmitting torque therebetween. The assembly further comprises an output member, placed in coaxial alignment with the input member, to provide a parallel mount and prevent residual imbalance superimposition, with a narrow gap separating the output member from the input member. The arbor further includes an extension which passes through the output member, and arbor bearing means, disposed in the housing, for rotatably supporting the arbor extension, thereby increasing the assembly bearing spread. The arbor may also include stop means, such as a shoulder, next to which the spring is placed, for assuring proper spring positioning within the assembly.

The extension of the arbor through the output end for support by the arbor bearing means increases the effective bearing spread of the input member/arbor subassembly, thereby stiffening the subassembly and reducing vibration. In addition, the overall configuration of the input and output clutch members is changed from a series (inboard/outboard) to a parallel spring mount and residual imbalances are not superimposed. The stop means on the arbor facilitates proper axial alignment of the coil spring relative to the internal drive surfaces of the clutch members, thereby eliminating the concern over improper assembly.

The spring clutch assembly may also include an improved spring design which includes a cross-over coil which traverses the input to output member gap, the coil having a cut provided parallel to the spring axes, at a width of about 0.020 inch, for restraining a greater portion of the medial coil section within the clutch members. The improved spring also includes a gradual ramp from the central coils to the teaser coils, extending over from 2-6 coils, to reduce the potential for a stress failure.

DETAILED DESCRIPTION OF THE INVENTION

Spring Clutch Assembly

Figure 1:
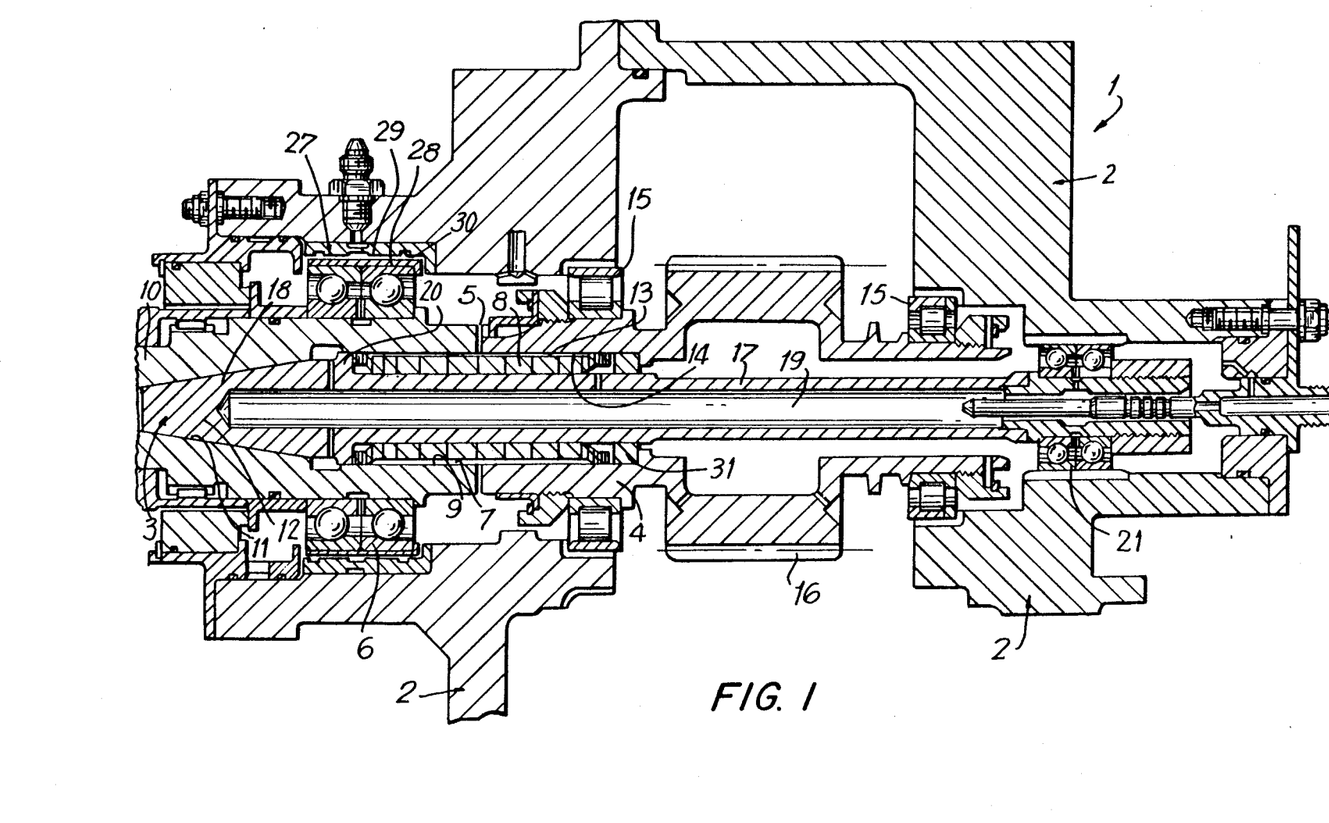
FIG. 1 is a cross-sectional view of the spring clutch assembly of the present invention.

Referring to FIG. 1, the spring clutch assembly of the present invention is shown. The assembly 1 includes a housing 2 which encloses an input clutch member 3 and an output clutch member 4. The housing, as shown, may be composed of various sections bolted together for ease in disassembly, but may also be of unitary construction. The input and output clutch members are generally cylindrical in shape and are disposed coaxially, and in end-to-end juxtaposition with a gap 5 therebetween. The input member is supported by bearings 6 disposed in the housing. The input clutch member includes a bore 7 axially disposed and open at an end thereof for positioning of a clutch spring 8 therein. The bore 7 provides an input drive surface 9 for spring engagement. A drive end 10 of the input member is engaged by a drive device (not shown) such as a gas turbine engine. The input member further includes a conical surface 11 interiorly thereof for mating with an arbor 12.

The output clutch member 4 includes a matching bore 13 for positioning of the clutch spring therein, with the bore 13 providing an output drive surface 14 for spring engagement. The output member 4 is rotatably supported by bearings 15 disposed within the housing 2. The output clutch member is engaged through a gear 16 to an output device (not shown) such as a gear box connected to a helicopter rotor.

The arbor 12 includes a shaft portion 17 with a conical end 18 for mating with the conical surface 11 in the input clutch member 3. The shaft 17 is hollow and includes a passage 19 which provides a flow path for lubricating oil. The conical surface 11 and conical end 18, are sized to provide a collet fit, maximizing radial support of the arbor. The collet fit increases the rigidity of the assembly by eliminating the slight gap required to fit pinned shafts together. Such rigidity is necessary to reduce centrifugal imbalances and limit vibrations.

The arbor shaft 17 extends from the input member 3 through the output clutch member 4, with the shaft 17 supporting the coil spring 8 placed thereover. The arbor further includes a shoulder 20, which is formed from the back wall of the conical end 18. The shoulder 20 provides a stop for precisely positioning the spring on the input side of the clutch assembly. Of course, the stop could be located on either end of the shaft, depending on the preferred method for assembly, and may be independent of the conical end 18.

The arbor shaft 17, unlike prior designs, extends beyond the end of the spring, passing through the output member bore 13 into the housing 2, where it is supported by bearings 21. The addition of bearings to support the arbor provides additional stiffening of the entire assembly by effectively increasing the bearing spread of the arbor/input member subassembly, reducing the potential for vibrations. In addition, such an extension achieves the increased bearing spread while maintaining the same overall assembly dimensions. Consequently, the inventive assembly may be adapted for use in applications where restrictive space and weight requirements are encountered. The arbor extension also eases removal by providing means for gripping and withdrawing the arbor/spring subassembly from the input member.

Figure 2:
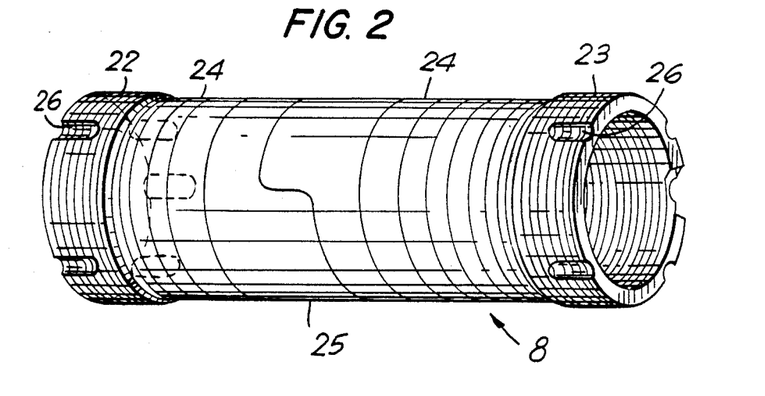
FIG. 2 is an enlarged view of a clutch spring usable in the assembly of FIG. 1.
Figure 3A:
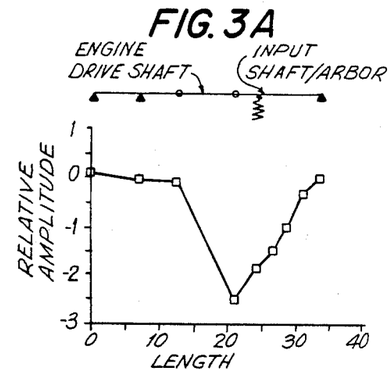
FIGS. 3A, 3B, 3C and 3D illustrate a first, rigid body mode shape and system natural frequencies for a spring clutch at various bearing spring rates.
Figure 3B:
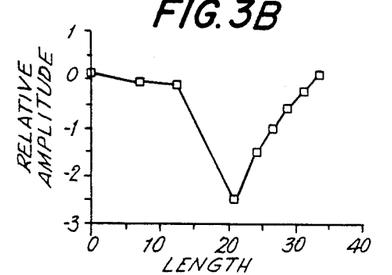
Figure 3C:
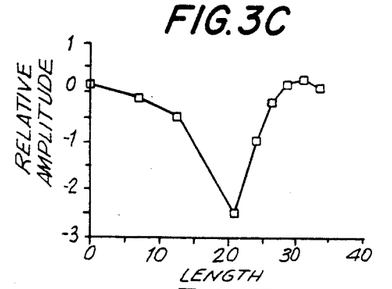
Figure 3D:
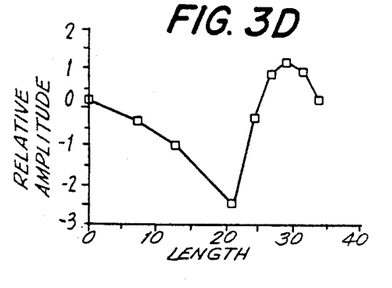
Figure 4A:
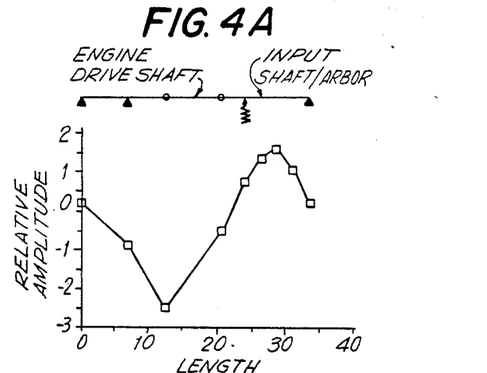
FIG. 4A, 4B, 4C and 4D illustrate a second, first bending mode shape and natural frequencies for a spring clutch at various spring rates.
Figure 4B:
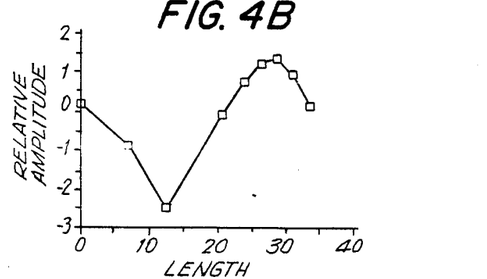
Figure 4C:
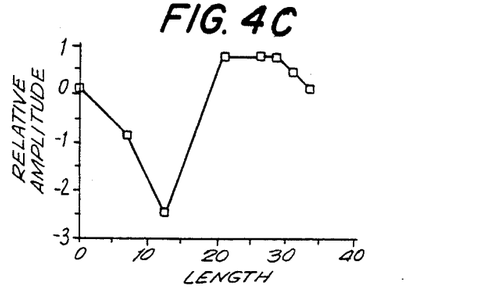
Figure 4D:
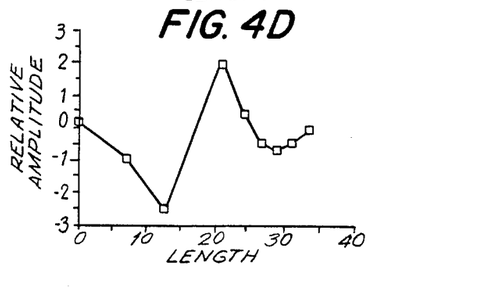

The coil spring 8 is usually pressed onto the arbor, abutting the shoulder 20, and is thus fixed at the input end of the arbor to assure rotation therewith. Referring to FIG. 2, the coil spring 8 includes input teaser coils 22, output teaser coils 23, central coils 24, and a cross-over coil 25 which traverses the gap 5 between the input and output members. The teaser coils are of larger outside diameter than the central coils to assure continuous contact with the drive surfaces, 9 and 14, with the difference in diameter being about 0.020 inch. The teaser coils 22 and 23 have oil relief grooves 26 to assure proper lubrication of the coils and drive surfaces.

In operation, a drive device, such as a gas turbine engine, turns the input clutch member 3, arbor 12 and coil spring 8 as a unit. Since the coil spring is fixedly engaged to the arbor, the spinning action causes the output teaser coils 23 to rub against the output drive surface 14, causing the spring to unwind and expand the central coils 24 outwardly into engagement with the input and output drive surfaces 9 and 14, respectively. Sufficient force is exerted to cause frictional engagement and consequently torque is transmitted from the input to the output clutch member. Should an autorotation be required, for example, when the engine rpm drops below the rotor rpm, the output member will run ahead of the turning coil spring, driving the teaser coils 23 to rewind the spring 8 and therefore disenqage the output member 4 from the input member 3, preventing damage to the engine.

The clutch spring assembly of the present invention overcomes the problem of rigid body mode vibration. A critical speed analysis of the mode shapes and natural frequencies of a spring support system was performed using a Myklestad iteration technique. Myklestad's method is used for analyzing critical speed and deflection mode shapes in beams, with the beams represented by lumped masses connected by massless beam sections having bending stiffness. The procedure involves calculating a residual moment or deflection at the end of the beam which would sustain vibration at a selected frequency. Using an iteration process, the frequency that can be sustained with zero end moment can be determined, which is the critical or resonance speed.

Referring to FIGS. 3A through 3D and 4A through 4D, the results of a critical speed analysis is shown for the driver/input member/arbor sub-assembly, represented at the top of the figures as a beam, with the input bearing represented as spring K. Mode shapes and frequencies are shown for various spring rates, with FIGS. 3A through 3D showing the first, rigid body mode, and FIGS. 4A through 4D showing the second, first bending mode of vibration. The results are presented in the following Table:

TABLE

| FIG. | Spring Rate, lbs/in | Rigid Body Mode, RPM | 1st Bending Mode, RPM |
|---|---|---|---|
| 3A/4A | 5,000 | 5,500 | 30,500 |
| 3B/4B | 50,000 | 13,700 | 31,000 |
| 3C/4C | 150,000 | 20,200 | 32,000 |
| 3D/4D | 500,000 | 25,200 | 33,600 |

The rigid body mode occurs between 5500 and 25,200 RPM, depending on spring rate, while the first bending mode occurs at or above around 30,000 RPM, regardless of spring rate. Therefore, the frequency of the first rigid body mode is highly influenced by the spring rate, whereas the frequency of the second mode (first bending mode) is more or less constant.

Figure 5:
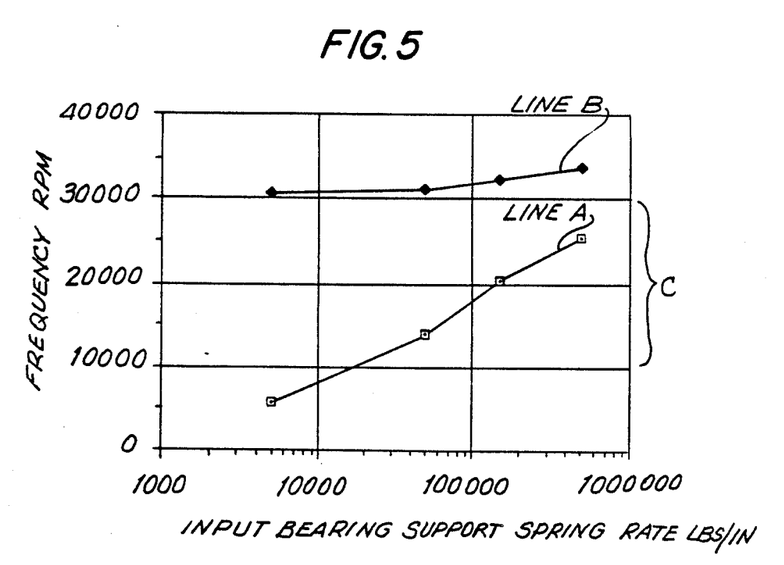
FIG. 5 is a graph of natural frequency versus spring rate for the input member bearings.

FIG. 5 shows the natural frequency versus the spring rate of the input member bearing, from 0 to 40,000 RPM. The rigid body mode is represented by line A, illustrating the relationship between mode occurrence and spring rate. The first bending mode is represented by line B, illustrating the relationship between mode occurrence and spring rate. A typical operating range for a helicopter is illustrated by bracket C, with idle at 10,000 RPM and a maximum speed of 30,000 RPM. From line A, it is seen that the rigid body mode may be moderated by adjusting the input bearing spring rate to be approximately 10,000 lbs per inch or less, preferably about 5,000 lbs per inch, thereby traversing the mode during startup and shutdown only. Using a spring rate of 10,000 lbs/in or less completely eliminates the rigid body mode from the operating range. Of course, adjusting the spring rate to move the rigid body mode above the operating range may also be used. For example, at the spring rate of about 500,000 lbs/in, the rigid body mode occurs at about 25,000 RPM, and this could be extrapolated to place the rigid body mode above 30,000 RPM. However, it is preferable to reduce rather than increase the spring rate.

Adjustment of the spring rate is achieved in the present invention by using a thin film of oil between the input bearing outer race and the housing to effect a lower spring rate stiffness. The oil film produces a low spring rate damper which influences both the frequency and amplitude of vibration and preferably reduces the spring stiffness to less than about 10,000 lbs per inch. Accordingly, the low spring rate damper enables passage through the rigid body mode at low speed, below the projected operating range, while the inherent damping characteristics reduce the amplitudes of any encountered vibrations to enhance the service life of the clutch assembly.

Referring to FIG. 1, a squeeze film damper 27 is employed on an outer race 28 of the input bearings 6, forming a small clearance gap 29 between the race and the housing, for example, about 0.001-0.005 inches, with grooves 30 for maintaining an oil layer in the gap. By varying the clearance or fluid viscosity, the effective spring rate and damping characteristics of the bearing is adjusted to the optimum setting. It may also be desirable to pressurize the oil to prevent fluid cavitation. Other spring rate damping means are usable with the present invention and may include an elastomer layer between the race and housing or a discontinuous contact race which allows the race to flex.

In high RPM applications, the spring clutch assembly has an increased sensitivity to axial alignment of the spring. Referring again to FIG. 1, a spacer 31 is provided on the arbor adjacent to the output member to provide a buffer of soft material between the end of the spring and the output member. Axial spring location is controlled by abutting the spring up to the arbor shoulder during assembly. The spacer then works in conjunction with the shoulder 20 to limit axial spring movement, with the spacer preventing the spring from wandering axially toward the output side of the clutch during its excursions from the arbor (compressed state) to the drive surfaces (expanded state). If there is insufficient axial clearance, the teaser coils 23 will tend to bind up during coil expansion and jam the spring at the output end. On the other hand, if there is excessive clearance, the spring can slowly move axially and have its central cross-over coil misplaced with respect to the gap between the input and output members, which could cause misalignment of the spring upon engagement. Generally an axial clearance of from 0.030 to 0.060 inches is sufficient to prevent these problems from developing.

Coil Spring for a Spring Clutch Assembly

Figure 6A:
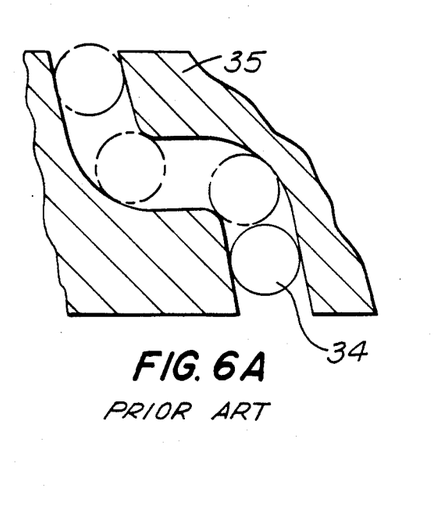
FIGS. 6A, 6B, 6C and 6D are enlarged views of a prior art cross-over spring coil.
Figure 6B:
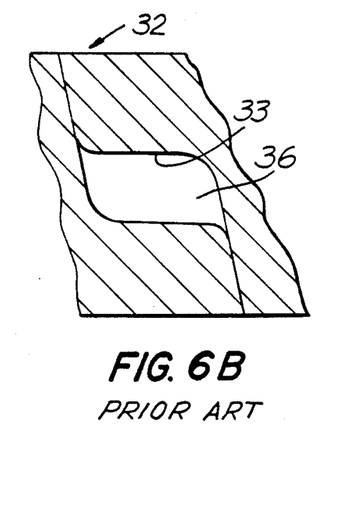

An improved spring may also be included in the present assembly, yet is also equally adaptable to other spring clutch assemblies. Referring to FIGS. 6A and 6B, a prior art cross-over coil 32 is shown including an axial cross-over cut 33. The clutch spring has a central cross-over coil formed by a conventional machining process. A cutter 34 cuts through a cylinder 35 at a particular pitch to form the coils. When the cross-over coil is reached, the cutter is directed axially for a predetermined amount and then redirected to cut at a given pitch. The axial cross-over cut straddles the gap between the members, assuring support without twisting. However, a small hole 36 is left on one side of the finished spring, shown in FIG. 6B in the compressed state, which could imbalance the spring.

Figure 6C:
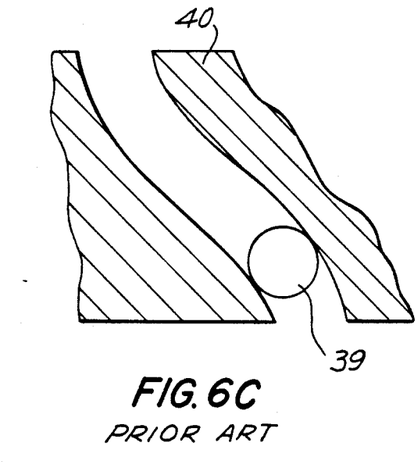
Figure 6D:
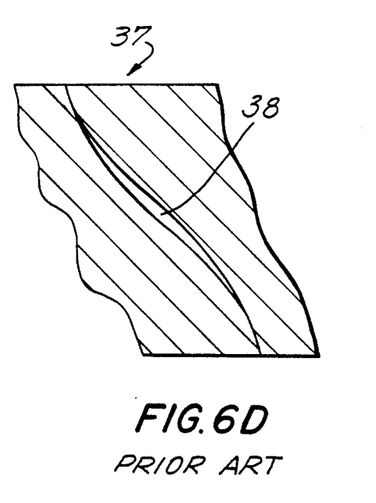

Referring to FIGS. 6C and 6D, a cross-over coil 37 is shown having a minimized cutout 38. A cutter 39 cuts through a cylinder 40 at a particular pitch to form the spring coils. When the cross-over coil is reached, the cutter is directed at a modified pitch chosen to minimize the cutout while supporting the spring in the gap. However, while the cutout is minimized, the angle formed would still tend to cock or misalign the spring during expansion, particularly in high RPM applications.

Figure 7A:
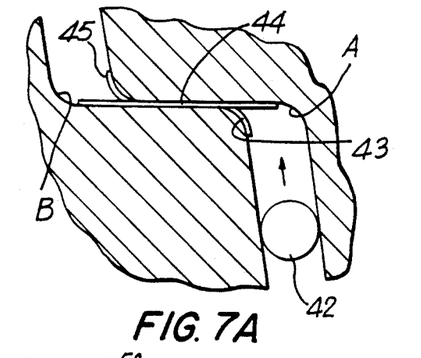
FIGS. 7A and 7B are enlarged views of the inventive cross-over spring coil.
Figure 7B:
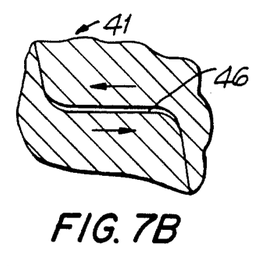

The clutch spring of the present invention overcomes this problem by including a cross-over coil having a very fine near axial cut, preferably produced using electron discharge machining (EDM) with a fine wire. Referring to FIG. 7, a cross-over coil 41 is partially cut using a cutter 42 which cuts through the cylinder at a predetermined pitch. When the cross-over point is reached, illustrated by point A, the cutter is removed and repositioned for cutting the remaining coils from point B to the end. A thin axial cut, preferably made by EDM, is made between point A and point B. The wire diameter is chosen for producing a cut which is approximately 0.020 inches wide. Three separate cuts are made to produce a smooth transition between points A and B: a first lead-in cut 43, covering an arc of about 90 degrees, an axial cut 44, and a lead-out cut 45, again covering an arc of about 90 degrees. As shown in FIG. 7B, when compressed, the central cross-over coil 41 has a substantially smaller cutout 46 for reducing any imbalance, while retaining full support of the cross-over coil across the gap. Under the twisting action of applied torque, the input and output clutch members will therefore remain aligned.

To further prevent the spring from unwinding into the gap, the gap between the input and output members should be reduced to a minimum, consistent with oil flow requirements. Generally a gap of about 0.030 inches is preferred.

Figure 8:
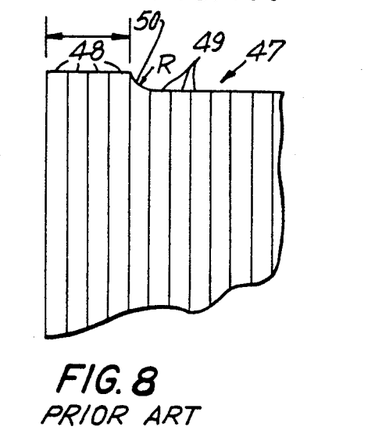
FIG. 8 is an enlarged view of a prior art central coil to teaser coil transition.

Another problem with existing spring coils is that at the intersection of the teaser coils and the central coils. A sharp transition occurs where the helix of the spring cuts across the intersection of the teaser coils and the central coils, leaving a knife edge which produces a stress riser. Referring to FIG. 8, a prior art spring 47 has four teaser coils 48 and central coils 49, with a sharp transition coil 50 therebetween, with a radius R. When the spring is expanded, the coil 50, just outside of the last teaser coil, is left partially unsupported, with the stress potentially causing spring failure. For example, it was estimated that a coil, not in contact with the drive surface along only a 90-degree arc, developed an additional bending stress of 50,000 psi.

To eliminate this problem, a gradual ramp from the teaser coils to the central coils is utilized. Generally, a ramp which smoothly joins the teaser coils to the central coils over a spread of from 2 to 6 coils, with about 4 coils preferred, may be used with each coil increasing incrementally in diameter, or having each coil including a tapered outer surface to achieve the smooth ramp. Such a ramp distributes the stress over several coils, reducing the potential for failure.

Figure 9:
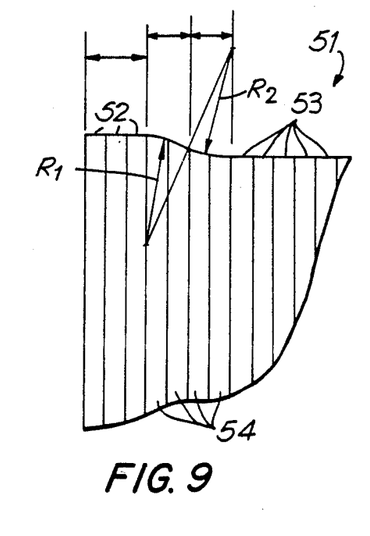
FIG. 9 is an enlarged view of a coil spring including a gradual ramp between the central and teaser coils.

Referring to FIG. 9, a coil spring 51 has three teaser coils 52, central coils 53, and four transition coils, 54, which provide a gradual ramp between the teaser and central coils. To minimize stress, an S-shaped surface is prepared with a first convex radius, $R_1$, provided over the first two coils, and a second concave radius, $R_2$, provided over the second two coils. As shown, the radius R is distributed over the four coils, rather than concentrated at a single coil.

Figure 10:
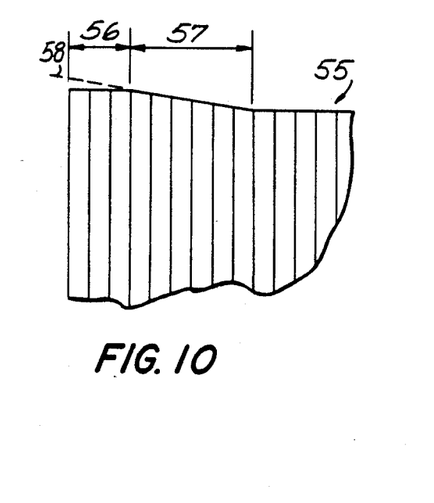
FIG. 10 is another embodiment illustrating the gradual ramp between the central and teaser coils.

Referring to FIG. 10, a coil spring 55 has three teaser coils 56 and six transition coils 57, which have tapered outer surfaces to provide a gradual ramp 58 between the central coils and the teaser coils. It should be noted that these views are highly exaggerated for illustrative purposes, as the difference in outside diameter is about 0.020 inch. While a simple modification, this change in design adds significantly to the life of a coil spring by eliminating a stress riser.

The spring clutch assembly of the present invention, utilizing coaxial clutch members and an increased bearing spread is less susceptible to vibration from imbalances, providing a more durable assembly even when vibrations occur. Utilizing an arbor including a positioning shoulder reduces the chances for improper assembly, while the extension of the arbor eases disassembly. Incorporating damper means on the input bearing reduces the spring rate, avoiding a rigid mode vibration, while damping any imbalances which do occur. Consequently, the spring clutch assembly of the present invention is particularly suited for high performance applications where vibration must be kept to a minimum.

In addition, utilizing a clutch spring including a gradual ramp to the teaser coils reduces the potential for a stress failure, with the use of an axial, fine cut at the cross-over coil reducing the potential for twisting or cocking during clutch operation. Consequently, a spring clutch assembly incorporating such a spring is more durable and less susceptible to damage than conventional spring clutch assemblies.

While the present invention has been shown and described in relation to a spring clutch for use in an aircraft, it will be understood by those skilled in the art that various modifications or changes could be made without varying from the scope of the present invention.

What is claimed is:

1. A spring clutch assembly comprising:
    a housing;
    an input clutch member rotatably disposed in the housing;
    an output clutch member, rotatably disposed in the housing, the output member placed in coaxial alignment with the input member to form a parallel mount, each member being separably rotatable, a narrow gap separating the output member from the input member;
    an arbor, having an input end and an output end, the arbor extending interiorly through the input and output members, into the housing, the input end fixedly engaged to the input member;
    arbor bearing means disposed in the housing for rotatably supporting the output end extending into the housing;
    a coil spring, disposed over the arbor, about half the coil spring disposed in a bore of the input member and half disposed in a bore of the output member, the coil spring being expandable into contact with the input and output members for transmitting torque therebetween.

2. The clutch assembly of claim 1 further comprising input bearing means, mounted in the housing, for rotatably supporting the input member; and, damping means, integral with the input bearing means, for adjusting the spring rate of the input bearing means in an amount sufficient to prevent a rigid body mode of vibration from occurring in a desired operating range of the assembly.

3. The assembly of claim 2 wherein the damper means comprise a squeeze film damper for producing a spring rate of about 10,000 lbs. per inch or less.

4. The assembly of claim 1 wherein the arbor has a conical input end for engaging a cone-shaped recess in the input member.

5. The assembly of claim 1 wherein the arbor has stop means disposed therein for positioning the coil spring on the arbor.

6. The assembly of claim 5 wherein the stop means comprise a shoulder formed integrally with the arbor.

7. The assembly of claim 1 further comprising a spacer disposed in the output member bore for limiting axial travel of the spring on the arbor.

8. The assembly of claim 7 wherein an axial clearance between the spring and the spacer of about 0.03 to 0.06 inch is provided.

9. The assembly of claim 1 wherein the narrow gap is about 0.03 inch wide.

10. A spring clutch assembly comprising a housing; an input clutch member disposed in the housing, the input clutch member having an axial bore extending therethrough, the bore including an input drive surface; input bearing means for rotatably supporting the input clutch member in the housing; an output clutch member, disposed in the housing in coaxial alignment with the input clutch member and separably rotatable therefrom, the members separated by a narrow gap, the output clutch member having an axial bore extending therethrough, the bore including an output drive surface; output bearing means, for rotatably supporting the output clutch member in the housing; an arbor, disposed with the input bore, extending from the input bore through the output bore, and from the output member into the housing in an amount sufficient to increase the assembly bearing spread, the arbor having a conical surface for fixedly engaging a conical shaped recess in the input member, the arbor rotatable with the input clutch member; arbor bearing means, disposed in the housing, for rotatably supporting the portion of the arbor extending from the output member into the housing; a clutch spring, disposed over the arbor, with half the spring disposed in the input bore and half disposed in the output bore, the clutch spring being expandable into contact with the input and output drive surface surfaces for transmitting torque from the input to the output clutch member, the arbor having stop means disposed thereon for positioning the clutch spring accurately in the assembly.

11. The clutch assembly of claim 10 further comprising damping means, integral with the input bearing means, for adjusting the spring rate of the input bearing means in an amount sufficient to prevent a rigid body mode of vibration from occurring in an operating range of the assembly.

12. The assembly of claim 10 wherein the stop means comprise a shoulder formed integrally with the arbor.

13. The assembly of claim 10 further comprising a spacer disposed in the output member bore for limiting axial travel of the spring on the arbor.

14. The assembly of claim 13 wherein an axial clearance between the spring and the spacer of about 0.03 to 0.06 in is provided.

15. The assembly of claim 10 wherein the narrow gap is about 0.03 inch wide.

16. A method for providing a spring clutch assembly comprising:
    providing a housing;
    rotatably disposing an output clutch member in the housing, the output member placed in coaxial alignment with the input member to form a parallel mount, each member being separably rotatable, a narrow gap separating the output member from the input member;

extending an arbor interiorly through both the input and output members, the arbor fixedly engaged to the output member;

disposing arbor bearing means in the housing for rotatable supporting the arbor;

disposing a coil spring over the arbor, about half the coil spring disposed in a bore of the input member and half disposed in a bore of the output member, the coil spring being expandable into contact with the input and output members for transmitting torque therebetween.

* * * * *

UNITED STATES PATENT AND TRADEMARK OFFICE
CERTIFICATE OF CORRECTION

PATENT NO. : 4,934,499
DATED : June 19, 1990
INVENTOR(S) : Jules G. Kish

It is certified that error appears in the above—identified patent and that said Letters Patent is hereby corrected as shown below:

Col. 1, line 63, "ave" should be --have--.

Col. 5, line 68, "disenqage" should be --disengage--.

Col. 10, claim 10, line 30 "with" should be --within--.

Col. 10, claim 10, line 42 the word "surface" before the word "surfaces", should be deleted.

Signed and Sealed this

Seventh Day of December, 1993

Attest:

BRUCE LEHMAN

Attesting Officer

Commissioner of Patents and Trademarks